(12) United States Patent
Ueyama

(10) Patent No.: US 7,710,469 B2
(45) Date of Patent: May 4, 2010

(54) IMAGE ACQUISITION APPARATUS

(75) Inventor: Tetsuji Ueyama, Hachioji (JP)

(73) Assignee: Olympus Corporation, Tokyo (JP)

( * ) Notice: Subject to any disclaimer, the term of this patent is extended or adjusted under 35 U.S.C. 154(b) by 818 days.

(21) Appl. No.: 11/634,271

(22) Filed: Dec. 6, 2006

(65) Prior Publication Data

US 2007/0153097 A1 Jul. 5, 2007

(30) Foreign Application Priority Data

Jan. 5, 2006 (JP) ............................. 2006-000741

(51) Int. Cl.
*H04N 5/262* (2006.01)
*H04N 5/217* (2006.01)
(52) U.S. Cl. ................. 348/240.2; 348/222.1; 348/241; 348/340; 382/255
(58) Field of Classification Search ....................... None
See application file for complete search history.

(56) References Cited

U.S. PATENT DOCUMENTS

| | | | |
|---|---|---|---|
| 6,628,329 B1 * | 9/2003 | Kelly et al. ................. | 348/252 |
| 6,873,358 B1 * | 3/2005 | Shimizu ................ | 348/240.99 |
| 7,227,573 B2 * | 6/2007 | Stavely ..................... | 348/240.2 |
| 7,408,139 B2 * | 8/2008 | Sekimoto et al. .......... | 250/208.1 |
| 7,577,348 B2 * | 8/2009 | Yamasaki ................... | 396/111 |
| 2008/0143881 A1 * | 6/2008 | Tsukioka .................... | 348/631 |

FOREIGN PATENT DOCUMENTS

JP 10-233950 A 9/1998

* cited by examiner

*Primary Examiner*—Ngoc-Yen T Vu
(74) *Attorney, Agent, or Firm*—Westerman, Hattori, Daniels & Adrian, LLP

(57) ABSTRACT

An image acquisition apparatus includes an optical system having such distortion aberration characteristics as a central region is expanded and a peripheral region is compressed. An imaging element converts a subject image formed image data. A first memory stores filter factors which are used for interrupting a spatial frequency exceeding a Nyquist frequency of the image data. A second memory stores parameters which define an outer edge of a Nyquist image region. A filter factor setting circuit judges whether each pixel position of the image data is included in the Nyquist image region based on the parameter, and reads the filter factors from the first memory when each pixel position is included. A filter circuit executes filter processing with respect to the image data in accordance with the read filter factors. A distortion correcting circuit corrects the distortion aberration characteristics with respect to the image data.

4 Claims, 4 Drawing Sheets

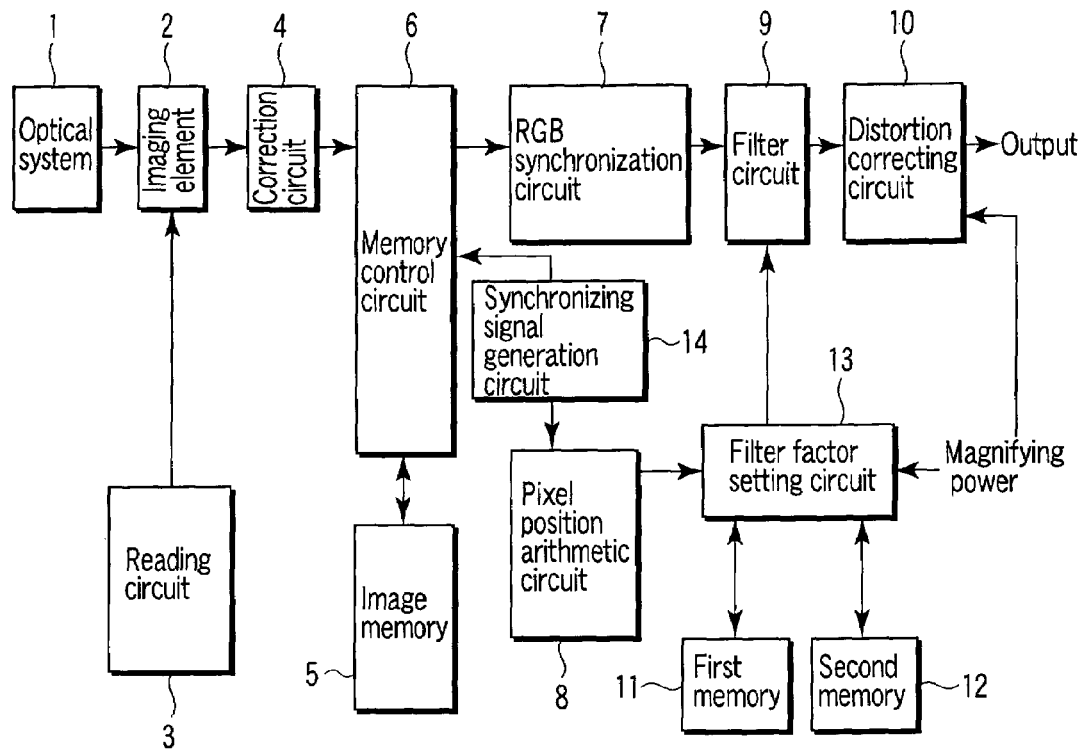
F I G. 1
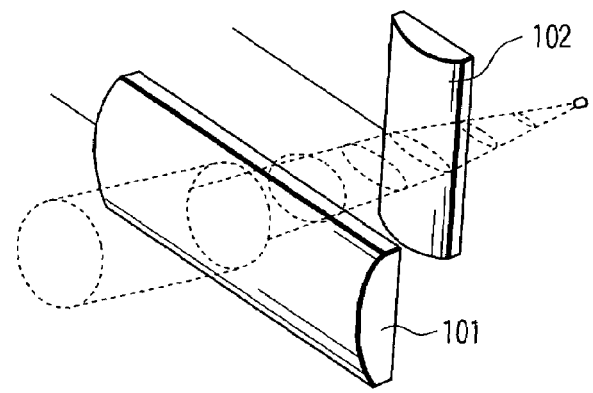
F I G. 2

IMAGE ACQUISITION APPARATUS

CROSS-REFERENCE TO RELATED APPLICATIONS

This application is based upon and claims the benefit of priority from prior Japanese Patent Application No. 2006-000741, filed Jan. 5, 2006, the entire contents of which are incorporated herein by reference.

BACKGROUND OF THE INVENTION

1. Field of the Invention

The present invention relates to an image acquisition apparatus.

2. Description of the Related Art

In image acquisition apparatuses such as a digital video camera or a digital still camera, there has been widely utilized a zoom function which changes a focal distance of a lens in accordance with a distance to a subject to be shot or a size occupied in a field angle and performs zooming without restraint. Usually, the zoom function is roughly classified into optical zooming which is realized by mechanically moving a lens and electronic zooming which utilizes a part of an image output from an imaging element and interpolating new pixels between pixels to perform zooming in and thins out pixels to effect zooming out. Although electronic zooming can be inexpensively realized with a small size since it does not require a driving portion, it is inferior in an image quality as compared with optical zooming.

On the other hand, in Jpn. Pat. Appln. KOKAI Publication No. 1998-233950, a fixed focal distance image input optical system having a function of compressing a peripheral region of an input image and a light receiving element which receives an incident subject image through the fixed focal distance image input optical system and mainly has a uniform pixel density are provided, and an image including a distortion due to compression in the fixed focal distance image input optical system is subjected to correcting conversion, thereby realizing a zoomed image having a resolution equivalent to that of optical zooming in an operating region. According to the technique described in Jpn. Pat. Appln. KOKAI Publication No. 1998-233950, deterioration in image quality in a peripheral region of both a wide-angle image and a telephoto image is unavoidable, but acquisition of an image which is less deteriorated in a central region thereof can be expected.

BRIEF SUMMARY OF THE INVENTION

According to a first aspect of the present invention, there is provided an image acquisition apparatus comprising:

an optical system having such distortion aberration characteristics as a central region is expanded and a peripheral region is compressed;

an imaging element which converts a subject image formed by the optical system into image data;

a first memory which stores filter factors which are used to perform filter processing which interrupts a spatial frequency exceeding a Nyquist frequency of the image data;

a second memory which stores parameters which define an outer edge of a Nyquist image region which is a region having a spatial frequency exceeding the Nyquist frequency in the image data;

a filter factor setting circuit which judges whether each pixel position of the image data is included in the Nyquist image region based on the parameters, and reads the filter factors from the first memory when each pixel position is included;

a filter circuit which executes filter processing with respect to the image data in accordance with the read filter factors; and a distortion correcting circuit which corrects the distortion aberration characteristics with respect to the image data from the filter circuit.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view showing a configuration of an image acquisition apparatus according to an embodiment of the present invention;

FIG. 2 is a view showing an example of a structure of an optical system used in an embodiment according to the present invention;

DETAILED DESCRIPTION OF THE INVENTION

Figure 3:
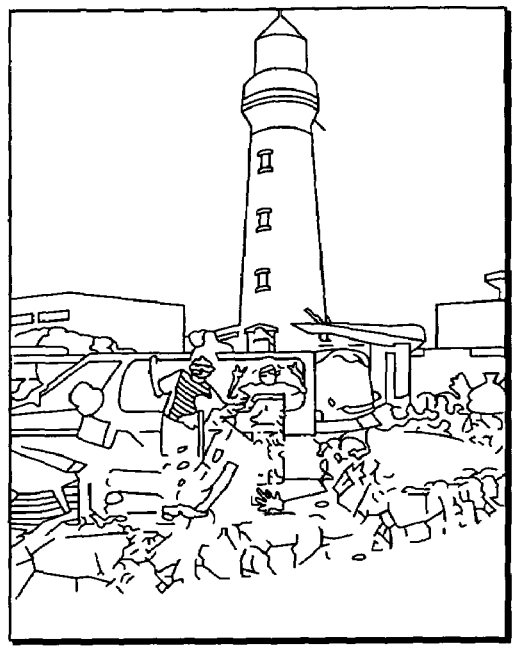
FIG. 3 is a view showing a subject image before being transmitted through the optical system.

An explanation will be first given as to the term "Nyquist image region" used in the following embodiment. This Nyquist image region means a region of image data having a spatial frequency exceeding a Nyquist frequency used in a sampling theorem of an image signal. According to the sampling theorem, in case of sampling an original image in a predetermined frequency(a sampling frequency) to create a reduced image, an aliasing distortion is not produced in the reduced image if a maximum spatial frequency included in this original image is not greater than the Nyquist frequency (=a frequency which is half the sampling frequency). Therefore, suppressing a band of the spatial frequency included in the original image to be not greater than the Nyquist frequency in advance can constrain generation of the aliasing distortion.

Since an optical system used in an embodiment described below has such distortion aberration characteristics as a central region of an incident subject image is expanded and a peripheral region of the same is compressed, correcting distortion of an image on a wide-angle side reduces the image in the vicinity of a central region. At this time, when an image region having a spatial frequency exceeding the Nyquist frequency, i.e., a Nyquist image region exists, an aliasing distortion is produced in a region of the reduced image corresponding to this Nyquist image region.

Thus, in this embodiment, there is carried out processing of detecting a position of a Nyquist image region in an image prior to the correction of the distortion and restricting a spatial frequency band exceeding a Nyquist frequency in the detected Nyquist image region to be not greater than the Nyquist frequency.

The embodiment according to the present invention will now be described hereinafter with reference to the accompanying drawings. FIG. 1 is a view showing a structure of an image acquisition apparatus according to one embodiment of the present invention. An image acquisition apparatus depicted in FIG. 1 is constituted of an optical system 1, an imaging element 2, a reading circuit 3, a correction circuit 4, an image memory 5, a memory control circuit 6, an RGB synchronization circuit 7, a pixel position arithmetic circuit 8, a filter circuit 9, a distortion correcting circuit 10, a first memory 11, a second memory 12, a filter factor setting circuit 13, and a synchronizing signal generation circuit 14.

Figure 4:
FIG. 4 is a view showing a subject image after being transmitted through the optical system.

The optical system 1 is an optical system having such a distortion aberration as a central region is expanded and a peripheral region is compressed. FIG. 2 is a view showing an example of a structure of the optical system 1 used in this embodiment. As shown in FIG. 2, the optical system 1 is constituted by combining cylindrical lenses 101 and 101 each having a semi-cylindrical shape lengthwise and crosswise. FIGS. 3 and 4 are views showing an effect of the optical system 1 depicted in FIG. 2. Here, FIG. 3 shows a subject image before being transmitted through the optical system 1, and FIG. 4 shows a subject image after being transmitted through the same. As can be understood from comparison between FIGS. 3 and 4, in the subjected image transmitted through the optical system 1, a central region is expanded and a peripheral region is compressed.

The imaging element 2 is constituted of a CCD sensor, a CMOS sensor or the like and converts a subject image image-formed through the optical system 1 into image data. The reading circuit 3 generates a synchronizing signal which controls reading of the image data from the imaging element 2 and outputs this signal to the imaging element 2. The imaging element 2 receives the synchronizing signal from the reading circuit 3 and outputs the image data to the correction circuit 4. The correction circuit 4 performs correction processing such as white balance correction or shading correction with respect to the image data read from the reading circuit 3.

The image memory 5 temporarily stores the image data corrected by the correction circuit 4. Here, the image memory 5 has a memory capacity at least required to correct the distortion in the later-described distortion correcting circuit 10 on a rear stage. The memory control circuit 6 controls writing image data into the image memory 5 and reading image data from the image memory 5.

The RGB synchronization circuit 7 generates image data having three colors RGB as one pixel component from image data having a Bayer alignment read from the image memory 5 through the memory control circuit 6. The pixel position arithmetic circuit 8 generates a coordinate of a position corresponding to each pixel in image data read in synchronization with reading image data from the image memory 5. The synchronizing signal generation circuit 14 generates a synchronizing signal which achieves synchronization of reading image data from the image memory 5 and an arithmetic operation of each pixel position in the pixel position arithmetic circuit 8. The synchronizing signal generated in this synchronizing signal generation circuit 14 is input to the memory control circuit 6 and the pixel position arithmetic circuit 8.

The filter circuit 9 executes filter processing (low-pass filter processing) which restricts a spatial frequency band of image data output from the RGB synchronization circuit 7 in accordance with a filter factor set by the filter factor setting circuit 13.

Figure 5:
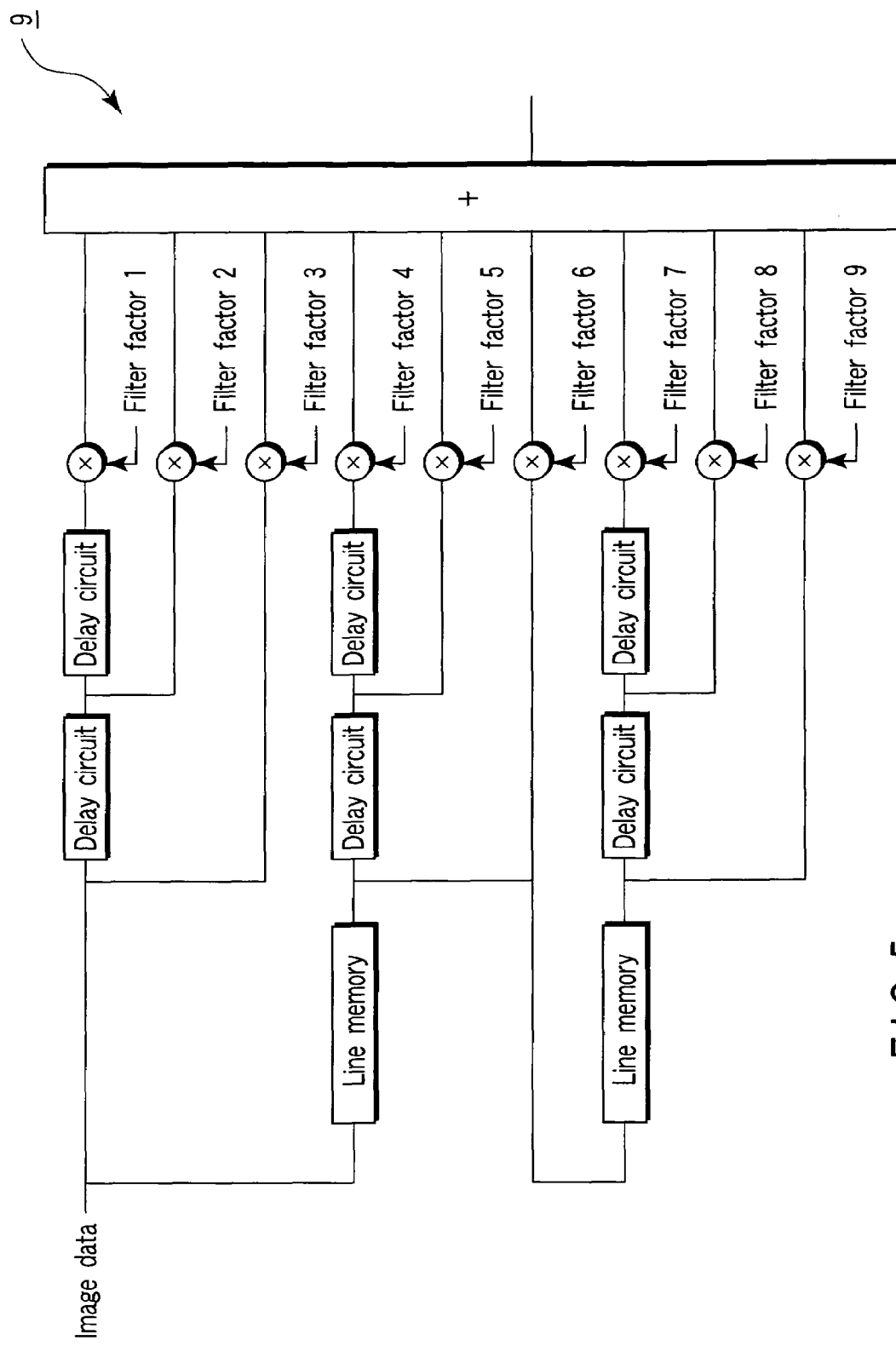
FIG. 5 is a view showing an example when a filter circuit is constituted of a matrix circuit.

FIG. 5 is a view showing an example when the filter circuit 9 is constituted of a matrix circuit. It should be noted that the circuit depicted in FIG. 5 is an example of a 3×3 filter. Image data having three pixels in a horizontal direction and three pixels in a vertical direction as one unit is input to the filter circuit 9. When the image data is input in this manner, the pixels in the image data corresponding to the first three pixels in the horizontal direction are respectively multiplied by filter factor 7, filter factor 8 and filter factor 9, the pixels in the image data corresponding to the subsequent three pixels in the horizontal direction are respectively multiplied by filter factor 4, filter factor 5 and filter factor 6, the pixels in the image data corresponding to the last three pixels in the horizontal direction are respectively multiplied by filter factor 1, filter factor 2 and filter factor 3, then image data multiplied by these filter factors are subjected to addition, and these data are sequentially output as image data concerning a pixel position multiplied by filter factor 5.

The distortion correcting circuit 10 has at least a distortion correcting section and a scaling section. The distortion correcting section corrects a distortion aberration with respect to such an output having a distortion aberration as shown in FIG. 4. Specifically, this section performs correction to scale down a central part and scale up a peripheral part. Furthermore, when execution of electronic zooming is set, the scaling section performs zoom-in/zoom-out processing of image data based on a magnifying power set by a non-illustrated CPU.

Figure 6:
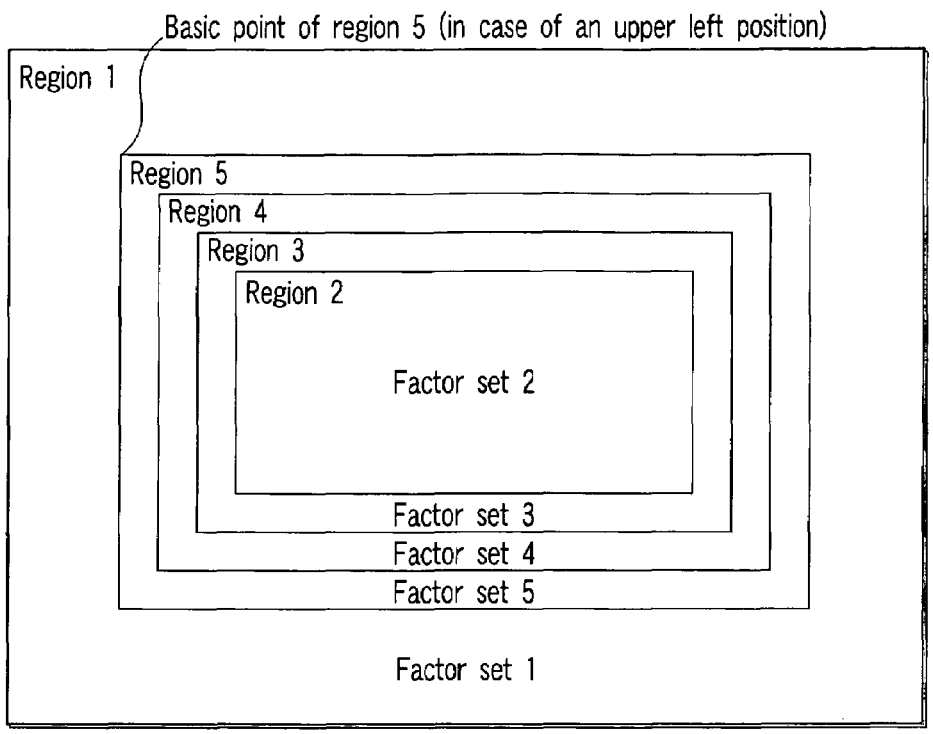
FIG. 6 is a view showing a relationship between filter factors stored in a first memory and a plurality of regions set in image data of one frame.

The first memory 11 stores filter factor sets in the filter circuit 9 by the filter factor setting circuit 13. FIG. 6 is a view showing a relationship between filter factors stored in this first memory 11 and a plurality of regions 1 to 5 set to image data of one frame. Here, a central region 2 is the above-described Nyquist image region, and regions 3 to 5 are buffer regions provided to moderate a change in an image quality between region 2 and other regions after filter processing by the filter circuit 9. FIG. 5 shows that filter factor set 1 is assigned to region 1; filter factor set 2, region 2; and filter factor sets 3 to 5, regions 3 to 5. The filter factor set means a set of a plurality of filter factors (filter factors 1 to 9 in the example of FIG. 5) set in the filter circuit 9.

Here, the filter factors are set in such a manner that a restriction in a band of a spatial frequency to be transmitted becomes moderate in the order of filter factor 2, filter factors 3 to 5, and filter factor 1. It should be noted that the buffer region is divided into three and filter factor sets 3 to 5 are assigned to the respective regions in this embodiment, but the number of buffer regions may be other than three. Moreover, the buffer regions may not be provided.

Additionally, each region shown in FIG. 6 represents a region where image processing is executed, and it does not represent an entire region of an image input from the imaging element 2. For example, when electronic zooming is used, pixels corresponding to the peripheral region are not required.

The second memory 12 stores parameters which are used to define outer edges of regions 2 to 5 depicted in FIG. 6. The following Table 1 shows an example of parameter sets which are stored in this second memory 12 and used to define outer edges of the regions.

TABLE 1

| Magnifying Power | Region | Basic Point | Vertical Width | Horizontal Width |
|---|---|---|---|---|
| z0 | 2 | p02 | wv02 | wh02 |
|  | 3 | p03 | wv03 | wh03 |
|  | 4 | p04 | wv04 | wh04 |
|  | 5 | p05 | wv05 | wh05 |
| z1 | 2 | p12 | wv12 | wh12 |
|  | 3 | p13 | wv13 | wh13 |
|  | 4 | p14 | wv14 | wh14 |
|  | 5 | p15 | wv15 | wh15 |
| z2 | 2 | p22 | wv22 | wh22 |
|  | 3 | p23 | wv23 | wh23 |
|  | 4 | p24 | wv24 | wh24 |
|  | 5 | p25 | wv25 | wh25 |

The parameter sets shown in this Table 1 are constituted of items "magnifying power", "region", "basic point", "vertical width" and "horizontal width".

The "magnifying power" is a parameter indicative of a scaling factor of an image when performing electronic zooming. The "region" is a parameter indicative of each of regions 2 to 5 depicted in FIG. 6. The "basic point" is a parameter indicative of a point serving as a reference of each region. It should be noted that an upper left coordinate point in the image region is shown as an example of the "basic point" in FIG. 6. Besides the upper left coordinate point in the image region, apexes of each region may be defined as the "basic point". The "vertical width" means a width in a vertical direction from the "basic point" in each region. The "horizontal width" is a parameter indicative of a width in a horizontal direction from the "basic point" in each region.

The second memory 12 storing such parameter sets is configured in such a manner that the respective parameters "region", "back point", "vertical width" and "horizontal width" corresponding to a "magnifying power" are read out.

Here, although Table 1 shows the example where there are three parameters of the "magnifying power", i.e., z0, z1 and z2, but the number of parameters is not restricted to three. Further, the "magnifying power" in the distortion correcting circuit 10 can be arbitrary set, but the "magnifying power" as a parameter which can be stored in the second memory 12 is restricted because of a memory region. Therefore, the "magnifying power" which can be set in the second memory has a discrete value. Therefore, when the "region", the "basic point", the "vertical width" and the "horizontal width" corresponding to the input "magnifying power" are not stored, the closest parameter set to the input "magnifying power" is used. Furthermore, it is also possible to perform an arithmetic operation such as linear interpolation based on the closest parameter set and the second closest parameter set in accordance with a value of the "magnifying power" to determine the parameter set.

The filter factor setting circuit 13 reads from the second memory 12 a parameter set corresponding to the "magnifying power" of electronic zoom processing set in the distortion correcting circuit 10 from the outside, judges which one of regions 1 to 5 shown in FIG. 6 includes a position of each pixel of image data calculated by the pixel position arithmetic circuit 8, and reads filter factor sets 1 to 5 corresponding to this judgment result to be set in the filter circuit 9.

It should be noted that parameters output from the second memory 12 define outer edges of the regions shown in FIG. 6, and do not include items which define inner edges of the same. However, it is good enough for the filter factor setting circuit 13 to be able to judge one of regions 1 to 5 which includes each pixel, and hence a judgment can be made if the outer edge alone of each region can be defined. As described above, parameters which define inner edges do not have to be stored in the second memory 12, thereby suppressing a data capacity per parameter.

An operation of the thus configured image acquisition apparatus will now be described.

A subject image formed in the imaging element 2 by the optical system 1 is converted into image data by the imaging element 2. The image data obtained by the imaging element 2 is read in accordance with a synchronizing signal from the reading circuit 3, and input to the correction circuit 4. The correction circuit 4 carries out correction such as correction of an influence of limb darkening or limb brightening which occurs in the optical system 1 or the imaging element 2 and correction of a white balance with respect to the image data. The image data corrected by the correction circuit 4 is output to the image memory 5 through the memory control circuit 6 and stored there. Then, the image data stored in the image memory 5 is read by the memory control circuit 6 in accordance with a synchronizing signal from the synchronizing signal generation circuit 14, and is input to the RGB synchronization circuit 7. In the RGB synchronization circuit 7, the image data having a Bayer alignment obtained by the imaging element is synchronized with image data having three pixels R, G and B as one pixel component. The image data synchronized in the RGB synchronization circuit 7 is output to the filter circuit 9.

Moreover, the synchronizing signal from the synchronizing signal generation circuit 14 is also input to the pixel position arithmetic circuit 8. Upon receiving this synchronizing signal, the pixel position arithmetic circuit 8 generates a horizontal coordinate and a vertical coordinate of each pixel in the image data, and the coordinate data is input to the filter factor setting circuit 13. Additionally, a "magnifying power" set in the distortion correcting circuit 10 is also input to the filter factor setting circuit 13. The filter factor setting circuit 13 reads from the second memory 12 a parameter set consisting of a "region, a "basic point, a "vertical width" and a "horizontal width" corresponding to the input "magnifying power". Further, the filter factor setting circuit 13 judges which one of regions 1 to 5 shown in FIG. 6 includes each pixel of the image data which is subjected to filter processing based on the parameters read from the second memory 12, reads filter factor sets 1 to 5 corresponding to the judgment result from the first memory 11 and sets them in the filter circuit 9.

Figure 7:
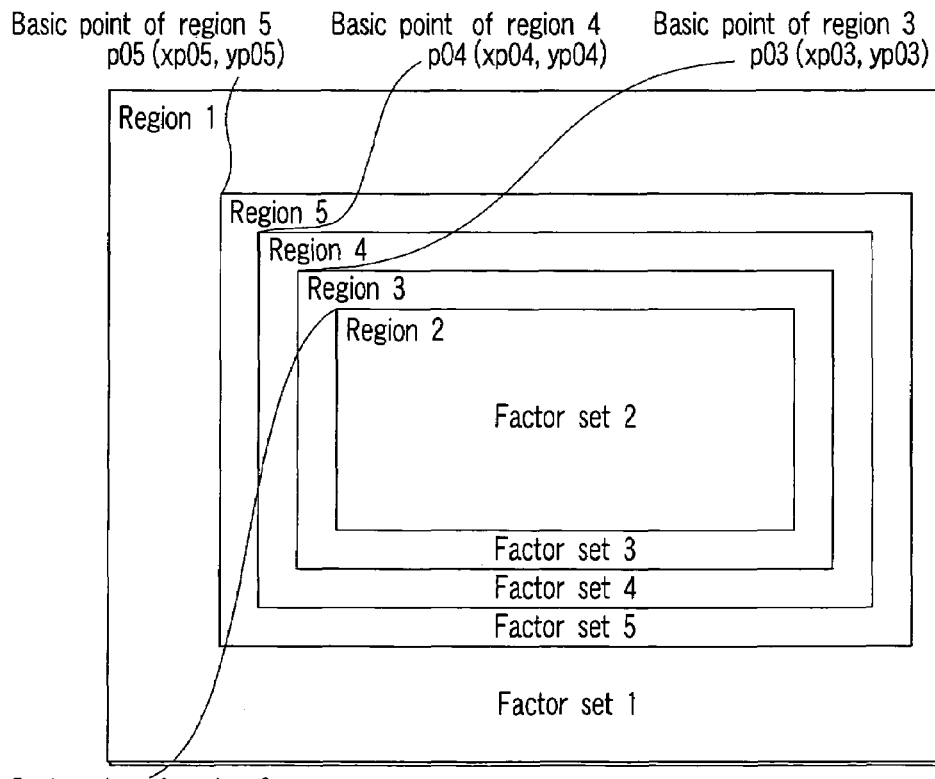
FIG. 7 is a view illustrating a setting operation of filter factor sets in a filter factor setting circuit.

Here, a setting operation of the filter factor sets in the filter factor setting circuit 13 will now be described with reference to FIG. 7.

As described above, the horizontal coordinate and the vertical coordinate of each pixel are input to the filter factor setting circuit 13 from the pixel position arithmetic circuit 8. These coordinates are determined as x01 and y01, respectively. Furthermore, a magnifying power is also supplied to the filter factor setting circuit 13. Here, it is assumed that one of z0, z1 and z2 in Table 1 is supplied in order to facilitate an explanation.

The filter factor setting circuit 13 reads the respective parameters "region", "basic point", "vertical width" and "horizontal width" corresponding to the magnifying power stored in the second memory 12. Moreover, the filter factor setting circuit 13 judges which one of the regions shown in FIG. 6 includes a pixel to be subjected to filter processing based on the respective parameters "region", "basic point", "vertical width" and "horizontal width" and x01 and y01. In the following description, a magnifying power is fixed and respective parameters are as shown in the following Table 2.

TABLE 2

| Region | Basic Point | Vertical Width | Horizontal Width |
|---|---|---|---|
| 2 | p02 (xp02, yp02) | wv02 | wh02 |
| 3 | p03 (xp03, yp03) | wv03 | wh03 |
| 4 | p04 (xp04, yp04) | wv04 | wh04 |
| 5 | p05 (xp05, yp05) | wv05 | wh05 |

First, a judgment upon which one of regions 1 to 5 shown in FIG. 7 includes x01 is made as follows.

(1a) Region 2 if xp02≦x01<(xp02+wh02)

(2a) Region 3 if xp03≦x01<xp02 or (xp02+wh02)≦x01<(xp03+wh03)

(3a) Region 4 if xp04≦x01<xp03 or (xp03+wh03)≦x01<(xp04+wh04)

(4a) Region 5 if xp05≦x01<xp04 or (xp04+wh04)≦x01<(xp05+wh05)

(5a) Region 1 in cases other than (1a) to (4a)

Subsequently, a judgment upon which one of regions 1 to 5 shown in FIG. 7 includes y01 is made as follows.

(1b) Region 2 if yp02≦y01<(yp02+wv02)

(2b) Region 3 if yp03≦y01<yp02 or (yp02+wv02)≦y01<(yp03+wv03)

(3b) Region 4 if yp04≦y01<yp03 or (yp03+wv03)≦y01<(yp04+wv04)

(4b) Region 5 if yp05≦y01<yp04 or (yp04+wv04)≦y01<(yp05+wv05)

(5b) Region 1 in cases other than (1b) to (4b)

Then, a region including x01 is compared with a region including y01 to judge which one of these regions includes a pixel. This judgment is made as shown in the following Table 3.

TABLE 3

| Judgment Results of Region of x | Judgment Results of Region of y | Judgment Results |
|---|---|---|
| Region 1 | Regions 1, 2, 3, 4, 5 | Region 1 |
| Region 2 | Region 1 | Region 1 |
| Region 2 | Region 2 | Region 2 |
| Region 2 | Region 3 | Region 3 |
| Region 2 | Region 4 | Region 4 |
| Region 2 | Region 5 | Region 5 |
| Region 3 | Region 1 | Region 1 |
| Region 3 | Regions 2, 3 | Region 3 |
| Region 3 | Region 4 | Region 4 |
| Region 3 | Region 5 | Region 5 |
| Region 4 | Region 1 | Region 1 |
| Region 4 | Regions 2, 3, 4 | Region 4 |
| Region 4 | Region 5 | Region 5 |
| Region 5 | Region 1 | Region 1 |
| Region 5 | Regions 2, 3, 4, 5 | Region 5 |

Based on such a judgment, a region including each pixel is determined, and a filter factor set corresponding to this judgment result is set in the filter circuit 9. For example, if the filter circuit 9 is the 3×3 matrix circuit shown in FIG. 5, filter factors 1 to 9 are set. The thus set filter factors are used to execute filter processing, thereby performing the filter processing concerning restriction in a band of a spatial frequency corresponding to a region including each pixel of an image input to the filter circuit 9. After the filter processing is carried out in this manner, image data is input to the distortion correcting circuit 10. Additionally, correction concerning a distortion aberration is executed by the distortion correcting circuit 10, then scaling processing is further performed, and a processing result is output.

According to the above-described structure of this embodiment, prior to correction of a distortion of an image obtained by the optical system 1 having such a distortion aberration as a central region is expanded and a peripheral region is compressed, a filter factor can be set in accordance with each region. As a result, a pass band of a spatial frequency can be determined in accordance with each region and, especially a band of a spatial frequency in region 2 as a Nyquist image region is suppressed to be not greater than a Nyquist frequency, thereby avoiding occurrence of an aliasing distortion in this region.

Further, in this embodiment, the buffer regions are provided in order to moderate a change in an image quality between region 2 as the Nyquist image region and the other regions. According to this structure, a filter factor can be set in accordance with each region, thus reducing a precipitous change in an image quality due to a sudden variation in filter characteristics.

Furthermore, since image data is stored in the image memory 5 prior to filter processing, various kinds of processing using a plurality of pixels (e.g., electronic zoom processing such as zoom-in processing or zoom-out processing) is possible on a rear stage.

Moreover, an arithmetic operation of a pixel position by the pixel position arithmetic circuit 8 is executed in synchronization with reading image data by the memory control circuit 6, thereby accurately setting each filter factor with respect to the filter circuit 9.

Here, although the description has been given as to the example where the first memory 11 and the second memory 2 are constituted of two memories in the foregoing embodiment, these memories may be formed of one memory. In such a case, it is good enough to add filter factors corresponding to respective regions of the second memory 12 in addition to contents of the first memory 11.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image acquisition apparatus comprising:

an optical system having such distortion aberration characteristics as a central region is expanded and a peripheral region is compressed;

an imaging element which converts a subject image formed by the optical system into image data;

a first memory which stores filter factors which are used to perform filter processing which interrupts a spatial frequency exceeding a Nyquist frequency of the image data;

a second memory which stores parameters which define an outer edge of a Nyquist image region which is a region having a spatial frequency exceeding the Nyquist frequency in the image data;

a filter factor setting circuit which judges whether each pixel position of the image data is included in the Nyquist image region based on the parameters, and reads the filter factors from the first memory when each pixel position is included;

a filter circuit which executes filter processing with respect to the image data in accordance with the read filter factors; and a distortion correcting circuit which corrects the distortion aberration characteristics with respect to the image data from the filter circuit.

2. The image acquisition apparatus according to claim 1, further comprising an image memory which stores image data from the imaging element, wherein the filter circuit executes filter processing with respect to image data read from the image memory.

3. The image acquisition apparatus according to claim 2, further comprising:

a pixel position arithmetic circuit which calculates each pixel position of the image data; and a synchronizing signal generation circuit which generates a synchronizing signal which achieves synchronization between reading the image data from the image memory and calculation by the pixel position arithmetic operation.

4. The image acquisition apparatus according to claim 1, wherein the second memory further stores parameters which define an outer edge of each of peripheral regions in accordance with each of the peripheral regions except the Nyquist image region, the peripheral regions being divided in accordance with each predetermined spatial frequency, and the filter factor setting circuit judges which one of the peripheral regions includes each pixel position of the image data based on the parameters which define the outer edge of each of the peripheral regions, and sets filter factors having a restriction in the band weakened as distanced from the Nyquist image region with respect to the filter circuit in accordance with a result of the judgment.

* * * * *